United States Patent [19]

Fan

[11] Patent Number: 5,412,648
[45] Date of Patent: May 2, 1995

[54] PACKET SWITCHING SYSTEM FOR FORWARDING PACKETS FROM INPUT BUFFERS USING IDLE/BUSY STATUS OF OUTPUT BUFFERS

[75] Inventor: Ruixue Fan, Tokyo, Japan

[73] Assignee: NEC Corporation, Tokyo, Japan

[21] Appl. No.: 173,214

[22] Filed: Dec. 27, 1993

[30] Foreign Application Priority Data

Dec. 25, 1992 [JP] Japan .................. 4-345020

[51] Int. Cl.$^6$ ............................................ H04L 12/56
[52] U.S. Cl. ................................. 370/60; 370/94.1
[58] Field of Search .............. 370/58.1, 58.2, 58.3, 370/60, 60.1, 94.1, 94.2; 340/825.5, 825.51, 825.03, 826, 825.04

[56] References Cited

U.S. PATENT DOCUMENTS

| | | | |
|---|---|---|---|
| 4,964,119 | 10/1990 | Endo et al. | 370/60 |
| 5,014,265 | 5/1991 | Hahne et al. | 370/60 |
| 5,126,999 | 6/1992 | Munter et al. | 370/60 |
| 5,291,482 | 3/1994 | McHarg et al. | 370/60.1 |

OTHER PUBLICATIONS

Y. Doi et al., "A very high-speed ATM switch with input and output buffers", ISS '92, vol. 2, Oct. 1992, pp. 231-235.

Primary Examiner—Wellington Chin
Attorney, Agent, or Firm—Sughrue, Mion, Zinn, Macpeak & Seas

[57] ABSTRACT

A packet switching system comprises input buffers and output buffers, and a self-routing network for routing packets from the input buffers to the output buffers according to the routing information contained in their header. An input controller, associated with each input buffer, includes an idle/busy memory. An output controller associated with each output buffer, detects the idle space of the associated output buffer and determines if the idle space is greater than a predetermined value. If the idle space is determined to be greater than the predetermined value, an idle status bit is generated and if the idle space is determined to be smaller than the predetermined value, a busy status bit is generated. The idle and busy status bits are broadcast to the idle/busy memory of all input controllers. Each input controller writes an incoming packet into the associated input buffer and reads it onto the self-routing network if an idle status bit is stored in the idle/busy memory corresponding to the routing information of the incoming packet.

8 Claims, 3 Drawing Sheets

FIG. 2

| CELL TRANSFER MODE | | MULTICAST | | | POINT-TO-POINT | | | MULTICAST | | | POINT-TO-POINT | | |
|---|---|---|---|---|---|---|---|---|---|---|---|---|---|
| | FIFO | CBR₁ | --- | CBR_N | CBR₁ | --- | CBR_N | VBR₁ | --- | VBR_N | VBR₁ | --- | VBR_N |
| OUTPUT OF COMPARATOR 31 | IDLE SPACE COUNT ≥ N | 0 | --- | 0 | | | | | | | | | |
| | IDLE SPACE COUNT < N | 1 | --- | 1 | | | | | | | | | |
| | IDLE SPACE COUNT ≥ 2N | | | | 0 | --- | 0 | | | | | | |
| | IDLE SPACE COUNT < 2N | | | | 1 | --- | 1 | | | | | | |
| OUTPUT OF COMPARATOR 33 | IDLE SPACE COUNT ≥ N | | | | | | | 0 | --- | 0 | | | |
| | IDLE SPACE COUNT < N | | | | | | | 1 | --- | 1 | | | |
| | IDLE SPACE COUNT ≥ 2N | | | | | | | | | | 0 | --- | 0 |
| | IDLE SPACE COUNT < 2N | | | | | | | | | | 1 | --- | 1 |

PACKET SWITCHING SYSTEM FOR FORWARDING PACKETS FROM INPUT BUFFERS USING IDLE/BUSY STATUS OF OUTPUT BUFFERS

BACKGROUND OF THE INVENTION

1. Field of the Invention

The present invention relates generally to packet switching systems, and more specifically to a packet switching system of the input-output buffering type for switching packets such as asynchronous transfer mode (ATM) cells.

2. Description of the Related Art

In a packet switching system of the input and output buffering type, as described in a paper "A very high-speed ATM switch with Input and output buffers", Yukihiko Doi et al, ISS'92 pages 231–235, incoming packets are stored in an input buffer and launched onto a self-routing network where it is routed to a destination output buffer according to the routing information of the packets. To achieve high throughput, it is necessary to provide as many high capacity output buffers as possible for bursty traffic and to provide a high speed scheduling algorithm for multicast traffic. It is still desirable to reduce the amount of output buffers required and to simplify the scheduling algorithm for both point-to-point and multicast traffic.

SUMMARY OF THE INVENTION

It is therefore an object of the present invention to provide a high throughput packet switching system which eliminates the need for high capacity output buffers.

Another object of the present invention is to provide a high throughput packet switching system which can be implemented with a simplified scheduling algorithm for both point-to-point and multicast According to a broader aspect of the present invention, there is provided a packet switching system comprising a plurality of input buffers connected respectively to a plurality of incoming links and a plurality output buffers connected respectively to a plurality of outgoing links. A self-routing network is connected between the input and output buffers for routing packets from the input buffers to the output buffers according to routing information contained in their header. A plurality of output controllers are associated respectively with the output buffers. Each output controller determines the idle space of the associated output buffer which is available for storing additional packets and determines whether the idle space is greater than a predetermined value. If the idle space is determined to be greater than the predetermined value, an idle status bit is generated and if the idle space Is determined to be smaller than the predetermined value, a busy status bit is generated. A plurality of input controllers are associated respectively with the input buffers for storing the idle and busy status bits from the output controllers in an idle/busy memory and writing an incoming packet into the associated input buffer. Each input controller reads a packet from the associated input buffer onto the self-routing network if an idle status bit is stored in the idle/busy memory corresponding to the destination of the stored packet.

According to a second aspect of the present invention, there is provided a packet switching system which comprise input buffers connected respectively to incoming links, output buffers connected respectively to outgoing links, and a self-routing network for routing packets from the input buffers to the output buffers according to routing information contained in the packets. A plurality of output controllers are associated respectively with the output buffers for determining an idle space of the associated output buffer which is available for storing additional point-to-point packets and additional multicast packets. Each output controller determines whether the idle space of point-to-point packets is greater than a first predetermined value and determines whether the idle space is greater than a second predetermined value smaller than the first predetermined value, and generates a first idle status bit or a first busy status bit into an idle/busy status memory if the idle space is determined to be greater or smaller than the first predetermined value, respectively, and generates a second idle status bit or a second busy status bit if the idle space is determined to be greater or smaller than the second predetermined value, respectively. A plurality of input controllers are associated respectively with the input buffers for storing the first idle and busy status bits and the second idle and busy status bits in an idle/busy memory and storing an incoming point-to-point packet into the associated input buffer and reading it if a first idle status bit is stored in the idle/busy memory corresponding to the destination of the point-to-point packet, and writing an incoming multicast packet into the associated input buffer and reading it if a second idle status bit is stored in the idle/busy memory corresponding to the incoming multicast packet.

BRIEF DESCRIPTION OF THE DRAWINGS

The present invention will be described In further detail with reference to the accompanying drawings, in which:

FIG. 2 is a table illustrating the idle/busy status bits generated by an output controller according to different cell types and stored in the idle/busy status memory of each input controller;

DETAILED DESCRIPTION

Figure 1:
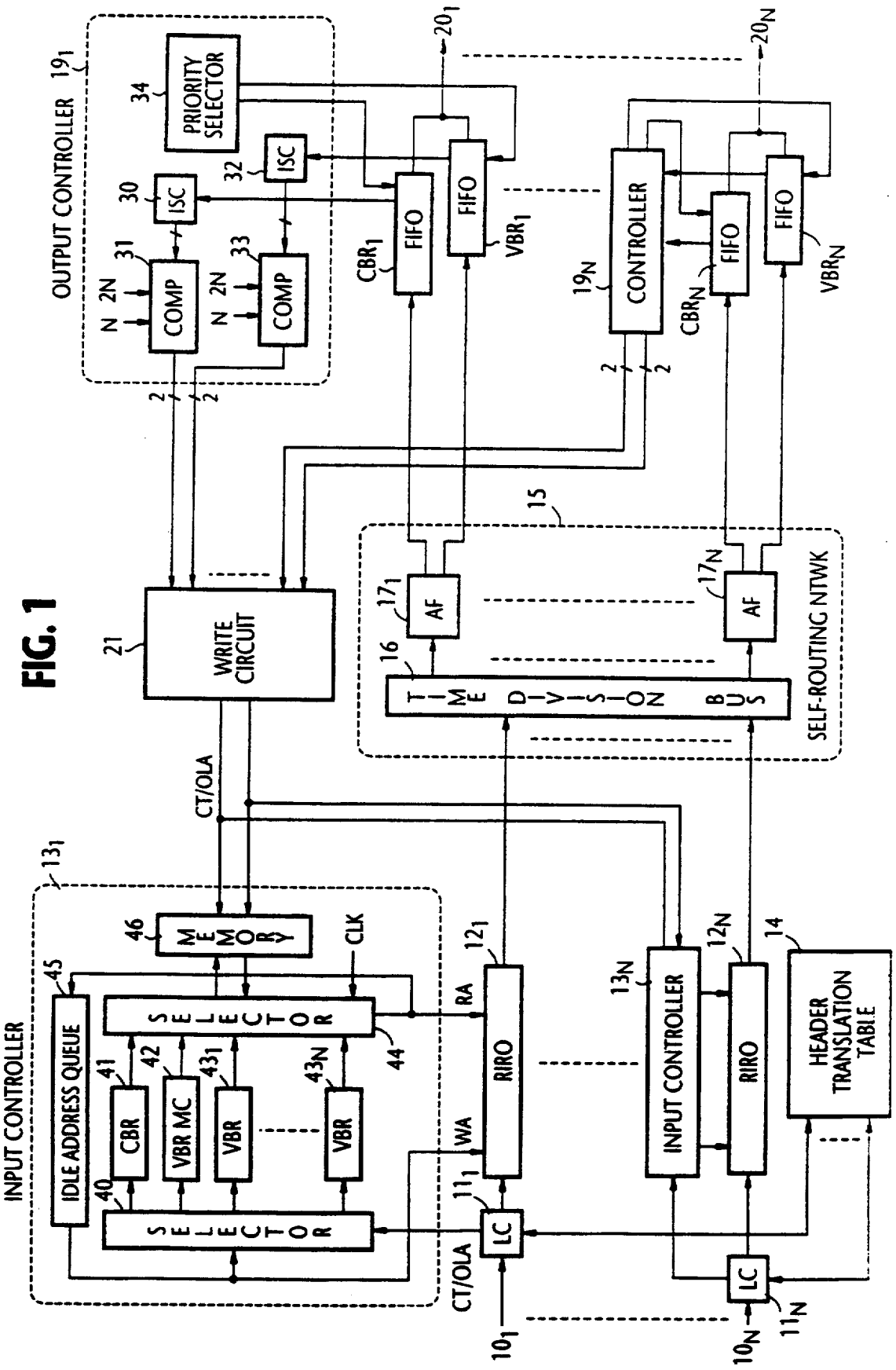
FIG. 1 is a block diagram of an ATM self-routing switching system according to the present invention.

Referring now to FIG. 1, there is shown an asynchronous transfer mode (ATM) switching system according to the present invention. The switching system comprises a plurality of line circuits $11_1$–$11_N$ which respectively serve as interfaces between incoming links $10_1$–$10_N$ and input buffers, or random-in-random-out memories $12_1$–$12_N$. Connected respectively to the line circuits $11_1$–$11_N$ and RIRO memories $12_1$–$12_N$ are input controllers $13_1$–$13_N$, each of which provides address control on incoming ATM cells to determine their write and read addresses of the associated RIRO memory in a manner as will be described in detail later. A header translation table 14 is connected to the line circuits $11_1$–$11_N$ to translate the VCI/VPI (virtual call identifier/virtual path identifier) field contained in the header of each incoming packet, called "ATM cell" to an outgoing link address (OLA) that specifies the appropriate outgoing link of the switching system in a well known manner. Each incoming cell contains a cell type field in its header to indicate the type of the cell as constant bit rate (CBR), variable bit rate (VBR), a point-to-point, or multicast data or a combination of these, Following the header translation on an incoming ATM cell, each line circuit 11i (where i=1, 2, ... N) supplies the cell type (CT) data and the outgoing link address (OLA) to the associated input controller $13_i$ and the whole contents of the cell to the associated RIRO memory $12_i$ where the cell is stored in a location specified by a write address WA supplied from input controller $13_i$ and eventually read out of the RIRO memory $12_i$ in response to a read address RA from input controller $13_i$.

The outputs of RIRO memories $12_1$-$12_N$ are connected to a self-routing network 15 which includes a time division bus 16, on which the outputs of RIRO memories 12 are time-division multiplexed, and a plurality of address filters $17_1$-$17_N$ connected to the bus 16. Address filters $17_i$ are provided corresponding respectively to the outgoing links $20_i$ and are assigned the output link address (OLA) of the corresponding output link plus two cell type identifiers identifying respectively CBR and VBR cells. Each address filter 17 has two output terminals for respectively delivering CBR and VBR cells to the output buffers of a corresponding pair. Each address filter allows passage of those ATM cells to one of the output buffers of the corresponding pair if it contains the output link address of the address filter and one of the cell type identifiers of the address filter. The outgoing buffers are implemented with first-in-first-out memories $CBR_1$-$CBR_N$ for exclusively storing CBR cells and FIFO memories $VBR_1$-$VBR_N$ for exclusively storing VRB cells. The outputs of the FIFO memories of each pair are connected together to a corresponding one of outgoing links $20_1$-$20_N$.

A plurality of output controllers $19_1$-$19_N$ are connected to outgoing FIFO memories $CBR_1$-$CBR_N$ and $VBR_1$-$VBR_N$, respectively. Each output controller includes an idle space (cell) counters 30 and 32 respectively connected to the associated FIFO memories to identify the type of cells stored in the associated FIFO memory using their cell type field and detect the number of cells of particular type that can be stored in each of the associated FIFO memories, Comparators 31 and 33 are connected to the output of idle space counters 30 and 32, respectively, for making a comparison between the idle space count from the respective (idle) space counter with reference values N and 2N to produce a logic-0 (idle) which indicates that a destination FIFO memory has a sufficient amount of idle space for accepting cells or a logic logic-1 indicating that it has not.

More specifically, comparator 31 produces a 0 if the idle space count in the FIFO memories $CBR_i$ (where i=1, 2, ..., N) is equal to or greater than N or a 1 if the idle space count is smaller than N. Comparator 31 further produces a 0 if the idle space count in the FIFO memories $CBR_i$ is equal to or greater than 2N or a 1 if the idle space count is smaller than 2N. Likewise, comparator 33 produces a 0 if the idle space count in the FIFO memories $VBR_i$ is equal to or greater than N or a 1 if the idle space count is smaller than N. Comparator 33 further produces a 0 if the idle space count in the FIFO memories $VBR_i$ is equal to or greater than 2N or a 1 if the idle space count is smaller than 2N.

A priority selector 34 is further provided in each of the output controllers 19. Priority selector 34 is connected to the FIFO memories of the associated pair for reading a CBR cell first from the CBR memory of the pair if a VBR cell is simultaneously stored in the VBR memory pair.

The comparators 31 and 33 of each output controller supply their idle/busy status bits to a write circuit 21. Write circuit 21 sequentially selects the output controllers to receive their output signals and produces a write address signal and broadcasts it together with the idle/busy status bits to all input controllers 13.

Each input controller 13 includes an input selector 40 and an output selector 44. Connected between the input and output selectors 40 and 44 are a plurality of FIFO memories 41, 42, $43_1$-$43_N$ for respectively storing different types (priority and destination) of cells. An idle address queue 45 is connected between an output terminal of selector 44 and an input of selector 40 for storing idle addresses that can be used as a write address for each incoming cell. Further provided in each input controller is an idle/busy memory 46 for storing the idle/busy status bits broadcast from the write circuit 21 as shown in FIG. 2.

The selector 40 of each input controller receives the CT and OLA fields of an incoming cell from the associated line circuit 11. On receiving the CT/OLA data, selector 40 reads an idle address from queue 45 and supplies it to the write address input of the associated RIRO memory 12 for writing the incoming cell into the memory 12. At the same time, it appends the CT/OLA data to the write address to form a read address signal and supplies it to one of the memories 41, 42, $43_1$-$43_N$ according to the type of the cell now stored in the RIRO memory 12.

CBR cells of either point-to-point or multicast type are stored in queue 41. VBR multicast cells are stored in queue 42 and VBR point-to-point cells are stored into one of the memories $43_1$-$43_N$ according to their destinations indicated by their OLA data. Note that CBR cells are given highest priority, VBR multicast cells second priority, and VBR point-to-point cells lowest priority.

Figure 3:
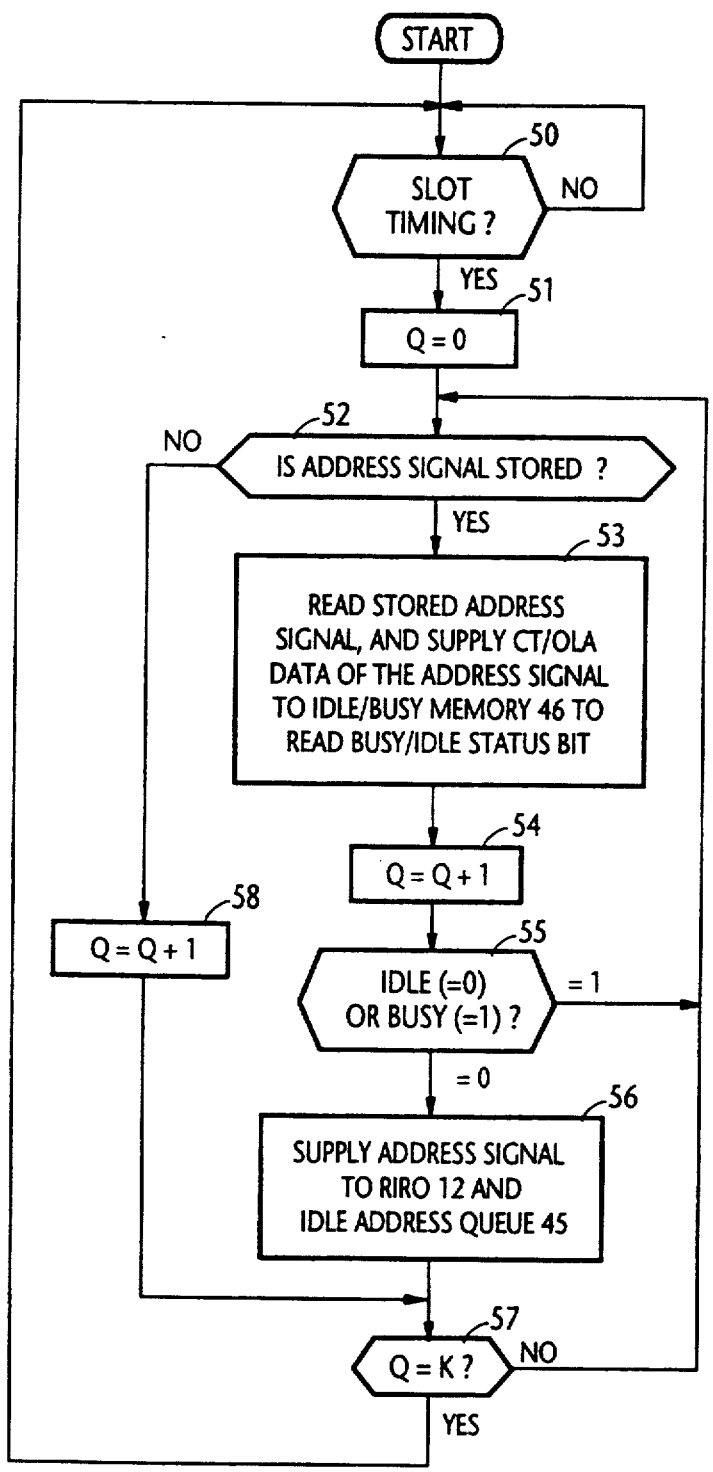
FIG. 3 is a flowchart of a sequence of Instructions performed by a selector of an input controller when a cell is read out of an associated RIRO memory.

The operation of the output selector 44 will be described with reference to FIG. 3. Selector 44 receives the system clock to determine the slot timing for reading an address signal (step 50), set a variable Q to zero (step 51), and accesses the output end of queues 41, 42 and 43, staring with queue 41 to determine whether an address signal is stored in that queue (step 52). If there is one, control branches at step 52 to step 53 to read the stored address signal and apply the CT and OLA data of the address signal to the idle/busy memory 46. An idle/busy status bit is therefore read out of a location of the idle/busy memory 46 corresponding to the cell to be read out of the associated RIRO memory 12. At step 54, the variable Q is incremented by 1 and, at step 55, control determines whether the idle/busy status bit from the idle/busy memory 46 is 1 or 0. If the idle/busy status bit is 1, control returns to step 52 to repeat the process on the output end of the next queue, and if it is 0, control branches to step 56 to supply the address data retrieved at step 53 to the associated RIRO memory 12 as a read address and to idle address queue 45 as an idle address. Control proceeds to step 57 to check to see if the variable Q is equal to K which indicates the number of memories 41, 42 and 43. If Q<K, control returns to step 52 to repeat the above process on the next queue, and if Q=K, it returns to step 50. If the decision at step 52 is negative, step 58 is executed by incrementing the variable Q by 1 and the value of Q is then checked at step 56.

In this way, those cells on which decision is made that their destination output buffers are not sufficient to accept are left in their memories until the destination output buffers are made available.

The advantageous effect of the present invention is that the storage capacity of each output buffer can be reduced and scheduling of cells to be launched into the self-routing network 15 from each input buffer can be performed at relatively low speed.

Figure 4:
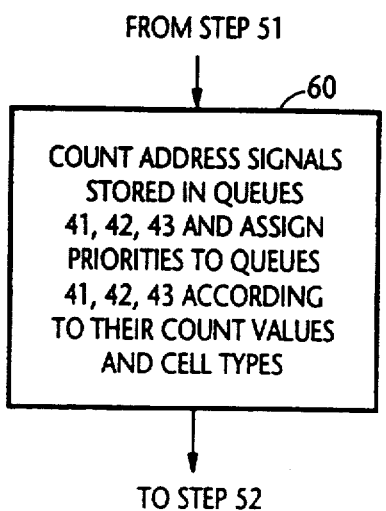
FIG. 4 is a modified version of the flowchart of FIG. 3.

A modified embodiment is shown in FIG. 4 in which priorities are assigned to memories 43 by taking into account the number of address signals stored in each of these memories 43 as well as the cell type of the stored address signals. As illustrated, step 60 is provided between steps 51 and 52 of flowchart of FIG. 3 for counting the address signals stored in each of the memories 41, 42, $43_1$–$43_N$ and priorities are respectively assigned to these memories according to their stored address counts and their cell types, so that address signals are read from these memories according to the assigned priorities at step 52.

What is claimed is:

1. A packet switching system comprising:
a plurality of input buffers connected respectively to a plurality of incoming links;
a plurality output buffers connected respectively to a plurality of outgoing links;
a routing network connected between said input buffers and said output buffers for routing packets from the input buffers to the output buffers according to routing information contained in the packets;
a plurality of output controllers associated respectively with said output buffers, each of the output controllers determining an idle space of the associated output buffer which is available for storing additional packets and determining whether the idle space is greater than a predetermined value, and generating an idle status bit if the idle space is determined to be greater than said predetermined value or a busy status bit if the idle space is determined to be smaller than said predetermined value; and
a plurality of input controllers associated respectively with said input buffers, each of the input controllers including memory means for storing said idle status bit and said busy status bit from said output controllers, and means for writing an incoming packet into the associated input buffer and reading the incoming packet therefrom onto the routing network if an idle status bit is stored in said memory means corresponding to the routing information of said incoming packet.

2. A packet switching system comprising:
N input buffers connected respectively to N incoming links where N is an integer greater than one;
N output buffers connected respectively to N outgoing links;
a self-routing network connected between said input buffers and said output buffers for routing packets from the input buffers to the output buffers according to routing information contained in the packets;
N output controllers associated respectively with said output buffers, each of the output controllers determining an idle space of the associated output buffer which is available for storing additional packets and determining whether the idle space is greater than N, and generating an idle status bit if the idle space is determined to be greater than N or a busy status bit if the idle space is determined to be smaller than N; and
N input controllers associated respectively with said input buffers, each of the input controllers including memory means for storing said idle status bit and said busy status bit from said output controllers, and means for writing an incoming packet into the associated input buffer and reading the incoming packet therefrom into the self-routing network if an idle status bit is stored in said memory means corresponding to the routing information of said incoming packet.

3. A packet switching system comprising:
a plurality of input buffers connected respectively to a plurality of incoming links;
a plurality of output buffers connected respectively to a plurality of outgoing links;
a self-routing network connected between said input buffers and said output buffers for routing packets from the input buffers to the output buffers according to routing information contained in the packets;
a plurality of output controllers associated respectively with said output buffers, each of the output controllers determining an idle space of the associated output buffer which is available for storing additional point-to-point packets and additional multicast packets, determining whether the idle space of point-to-point packets is greater than a first predetermined value, determining whether the idle space of multicast packets is greater than a second predetermined value smaller than said first predetermined value, generating a first idle status bit or a first busy status bit if the idle space is determined to be greater or smaller than said first predetermined value, respectively, and generating a second idle status bit or a second busy status bit if the idle space is determined to be greater or smaller than said second predetermined value, respectively; and
a plurality of input controllers associated respectively with said input buffers, each of the input controllers including memory means for storing said first idle and busy status bits and second idle and busy status bits from said output controllers, and means for writing an incoming point-to-point packet into the associated input buffer and reading the incoming point-to-point packet therefrom onto the self-routing network if a first idle bit from is stored in said memory means corresponding to the routing information of the incoming point-to-point packet, storing an incoming multicast packet into the associated input buffer and reading the incoming multicast packet therefrom onto the self-routing network if a second idle status bit is stored in said memory means corresponding to the incoming multicast packet.

4. A packet switching system comprising:
N input buffers connected respectively to N incoming links where N is an integer greater than one;
N output buffers connected respectively to N outgoing links;
a self-routing network connected between said input buffers and said output buffers for routing packets from the input buffers to the output buffers according to routing information contained in the packets;
N output controllers associated respectively with said output buffers, each of the output controllers determining an idle space of the associated output buffer which is available for storing additional point-to-point packets and additional multicast packets, determining whether the idle space of point-to-point packets is greater than M which is an integer greater than N and whether the idle space of multicast packets is greater than N, generating a first idle status bit or a first busy status bit i the idle space is determined to be greater or smaller than M, respectively, and generating a second idle status bit or a second busy status bit if the idle space is determined to be greater or smaller than N, respectively; and N input controllers associated respectively with said input buffers, each of the input controllers including memory means for storing the first idle and busy status bits and the second idle and busy status bits from said output controllers, and means for writing an incoming point-to-point packet into the associated input buffer and reading the incoming point-to-point packet therefrom onto the self-routing network if a first idle status bit is stored in said memory means corresponding to the routing information of the incoming point-to-point packet, writing an incoming multicast packet therefrom onto the self-routing network if a second idle status bit is stored in said memory means corresponding to the incoming multicast packet.

5. A packet switching system as claimed in claim 1, 2, 3 or 4, wherein each of said input controllers comprises:
an idle address queue;
a high priority queue and a low priority queue;
first selector means for retrieving an address signal from said idle address queue and writing an incoming packet into a location of the associated input buffer specified by the retrieved address signal, and writing the retrieved address signal into one of said high and low priority queues according to priority to the incoming packet;
second selector means for retrieving an address signal from each of said high and low priority queues, retrieving an idle/busy status bit from said memory means corresponding to the retrieved address signal, determining whether the retrieved idle/busy status is 0 or 1, and supplying the retrieved address signal to said idle address queue and to the associated input buffer when the retrieved idle/busy status bit is determined to be 0 for reading a packet from the associated input buffer onto the self-routing network, or leaving the retrieved address signal in said first and second priority queues if the retrieved idle/busy status bit is determined to be 1,
each of said output buffers including a high priority memory for storing packets of high priority and a low priority memory for storing packets of low priority,
each of the output controllers including means for forwarding a packet from the high priority memory of the associated output buffer to the associated outgoing link earlier than a packet from the low priority memory of the associated output buffer when more than one packet exists simultaneously in said high and low priority memories of the associated output buffer.

6. A packet switching system as claimed in claim 1, 2, 3 or 4, wherein each of said input controllers comprises:
an idle address queue;
a plurality of busy address queues;
first selector means for retrieving an address signal from said idle address queue and writing an incoming packet into the associated input buffer corresponding to the retrieved address signal, and writing the retrieved address signal into one of said busy address queues according to the routing information of the incoming packet; and
second selector means for retrieving an address signal from each of said busy address queues, retrieving an idle/busy status bit from said memory means corresponding to the address signal retrieved from said busy address queues, determining whether the retrieved idle/busy status is 0 or 1, and supplying the retrieved address signal to said idle address queue and to the associated input buffer if the retrieved idle/busy status bit is determined to be 0 for reading a packet from the associated input buffer onto the self-routing network, or leaving the retrieved address signal in said busy address queues if the retrieved idle/busy status bit is determined to be 1.

7. A packet switching system as claimed in claim 1, 2, 3 or 4, wherein each of said input controllers comprises:
an idle address queue;
a plurality of busy address queues;
first selector means for retrieving an address signal from said idle address queue and writing an incoming packet into the associated input buffer corresponding to the retrieved address signal, and writing the retrieved address signal into one of said busy address queues according to the routing information of the incoming packet; and
second selector means for retrieving an address signal from said busy address queues according priority of packets stored therein, retrieving an idle/busy status bit from said memory means corresponding to the address signal retrieved from said busy address queues, determining whether the retrieved idle/busy status is 0 or 1, and supplying the retrieved address signal to said idle address queue and to the associated input buffer if the retrieved idle/busy status bit is determined to be 0 for reading a packet from the associated input buffer onto the self-routing network, or leaving the retrieved address signal in said busy address queues if the retrieved idle/busy status bit is determined to be 1.

8. A packet switching system as claimed in claim 1, 2, 3 or 4, further comprising means for sequentially receiving an idle/busy status bit from each of said output controllers and generating a write address signal and broadcasting the write address signal together with the idle/busy status to all of said input controllers for writing the idle/busy status bit into the memory means of said input controllers.

* * * * *

UNITED STATES PATENT AND TRADEMARK OFFICE
CERTIFICATE OF CORRECTION

PATENT NO. : 5,412,648
DATED : May 2, 1995
INVENTOR(S) : Ruixue Fan

It is certified that error appears in the above-indentified patent and that said Letters Patent is hereby corrected as shown below:

Column 1, Line 38, after "multicast", insert --traffic.--

Column 3, Line 6, delete "111" and insert --11$_i$--.

Column 4, Line 45, delete "staring" and insert --starting--.

Signed and Sealed this

Third Day of October, 1995

BRUCE LEHMAN

*Attest:*

*Attesting Officer*     *Commissioner of Patents and Trademarks*